(12) United States Patent
Luo et al.

(10) Patent No.: US 12,056,618 B2
(45) Date of Patent: Aug. 6, 2024

(54) PACKING METHOD AND ELECTRONIC DEVICE

(71) Applicants: Inventec (Pudong) Technology Corporation, Shanghai (CN); INVENTEC CORPORATION, Taipei (TW)

(72) Inventors: Ying-Sheng Luo, Taipei (TW); Trista Pei-Chun Chen, Taipei (TW); Li-Ya Su, Taipei (TW); Ching Hui Li, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 211 days.

(21) Appl. No.: 17/932,290

(22) Filed: Sep. 14, 2022

(65) Prior Publication Data

US 2024/0070472 A1    Feb. 29, 2024

(30) Foreign Application Priority Data

Aug. 30, 2022    (CN) .......................... 202211048250.3

(51) Int. Cl.
  *G06N 3/12*      (2023.01)
  *B65B 57/00*     (2006.01)
  *G06N 3/126*     (2023.01)

(52) U.S. Cl.
  CPC ............. *G06N 3/126* (2013.01); *B65B 57/00* (2013.01)

(58) Field of Classification Search
  None
  See application file for complete search history.

(56) References Cited

U.S. PATENT DOCUMENTS

| 5,390,283 | A | * | 2/1995 | Eshelman | ............. | G06N 3/126 |
| | | | | | | 706/62 |
| 10,977,411 | B1 | * | 4/2021 | Lin | ....................... | G06F 30/392 |
| 2020/0027003 | A1 | * | 1/2020 | Wu | ........................ | G06T 17/00 |

FOREIGN PATENT DOCUMENTS

| CN | 110490371 | A | * | 11/2019 | | |
| GB | 2524952 | A | * | 10/2015 | ............. | B65B 57/00 |

* cited by examiner

*Primary Examiner* — Tanzim Imam
(74) *Attorney, Agent, or Firm* — CKC & Partners Co., LLC

(57) ABSTRACT

The present disclosure provides a packing method including following steps. Genetic algorithm is utilized to calculate multiple packing programs. Multiple candidate packing programs including all items are selected from the packing programs. Among each of the candidate packing programs, at least one of the items to be placed earlier is classified into a first subset, and at least another one of the items to be placed later is classified into a second subset. Among each of the candidate packing programs, a first packing for the first subset is maintained, and a second packing for the second subset is recalculated by using a greedy algorithm to generate an updated second packing.

10 Claims, 8 Drawing Sheets

PACKING METHOD AND ELECTRONIC DEVICE

CROSS-REFERENCE TO RELATED APPLICATION

This application claims priority to China Application Serial Number 202211048250.3, filed Aug. 30, 2022, which is herein incorporated by reference in its entirety.

BACKGROUND

Field of Invention

The present invention relates to a packing method. More particularly, the present invention relates to a packing method and an electronic device.

Description of Related Art

In some cases, a packing process of electronic goods, such as a laptop and its accessory, is one of the last steps in the manufacturing process before shipping the laptop to the customer. An order usually contains multiple items, and these items are usually packed into one (occasionally two or more) container box. For example, an order may contain a laptop, a laptop bag, a mouse, an external keyboard.

The shape of each item can be represented in three-dimensions, i.e., width, height, depth. Container boxes also can be represented in three-dimensions specified in width, height, depth. The packing is to contain all of the items specified in the order into the right container box, or several boxes if all of the items don't fit in one container. In some prior arts, an approximation/optimization algorithm is utilized to find a solution for a packing plane faster. However, the solution generated by the approximation/optimization algorithm might not be an optimal solution.

Therefore, how to provide a packing method to generate an optimal solution and speed up the calculation process is an important issue in this field.

SUMMARY

To achieve the aforesaid purpose, one aspect of the present disclosure is related to a packing method. The packing method includes following steps. Size data of a plurality of items are received. A plurality of packing programs are calculated by utilizing a genetic algorithm according to the size data of the items. A plurality of candidate packing programs containing all of the items are selected from the packing programs. Among each of the candidate packing programs, at least one of the items to be placed earlier is classified into a first subset, and at least another one of the items to be placed later is classified into a second subset. Among each of the candidate packing programs, a first packing of the first subset is remained and a second packing of the second subset is recalculated, by a greedy algorithm, to generate an updated second packing of the second subset. A plurality of updated candidate packing programs are generated according to the first packing of the first subset and the updated second packing of the second subset for each of the candidate packing programs. One of the updated candidate packing programs is outputted as a target packing program.

The other aspect of the present disclosure is related to an electronic device. An electronic device includes a memory and a processor. The memory is configured to store a genetic algorithm and a greedy algorithm. The processor is electrically coupled to the memory. The processor is configured to perform following steps. A plurality of packing programs are calculated, by utilizing the genetic algorithm, according to the size data of the items. A plurality of candidate packing programs containing all of the items are selected from the packing programs. Among each of the candidate packing programs, at least one of the items to be placed earlier is classified into a first subset, and at least another one of the items to be placed later is classified into a second subset. Among each of the candidate packing programs, a first packing of the first subset is remained, and a second packing of the second subset is recalculated by the greedy algorithm to generate an updated second packing of the second subset. A plurality of updated candidate packing programs are generated according to the first packing of the first subset and the updated second packing of the second subset for each of the candidate packing programs. One of the updated candidate packing programs is outputted as a target packing program.

Summary, the electronic device and the packing method utilizes the genetic algorithm in conjunction with the greedy algorithm, such that the optimal solution can be calculated in less calculation time, so as to increase a volume ratio, efficiency for packing process and surface area ratio, and to optimize the packing program.

BRIEF DESCRIPTION OF THE DRAWINGS

The present invention can be more fully understood by reading the following detailed description of the embodiment, with reference made to the accompanying drawings as follows.

DETAILED DESCRIPTION

Figure 1:
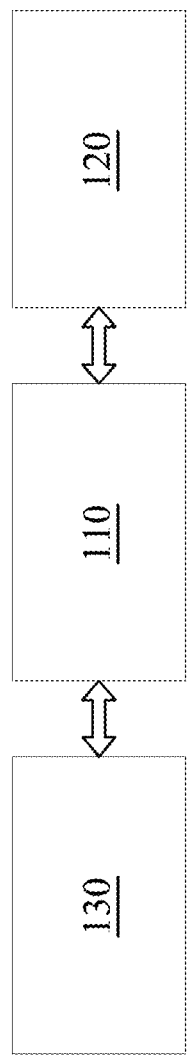
FIG. 1 is a schematic diagram of an electronic device in accordance with one embodiment of the present disclosure.
Figure 2A:
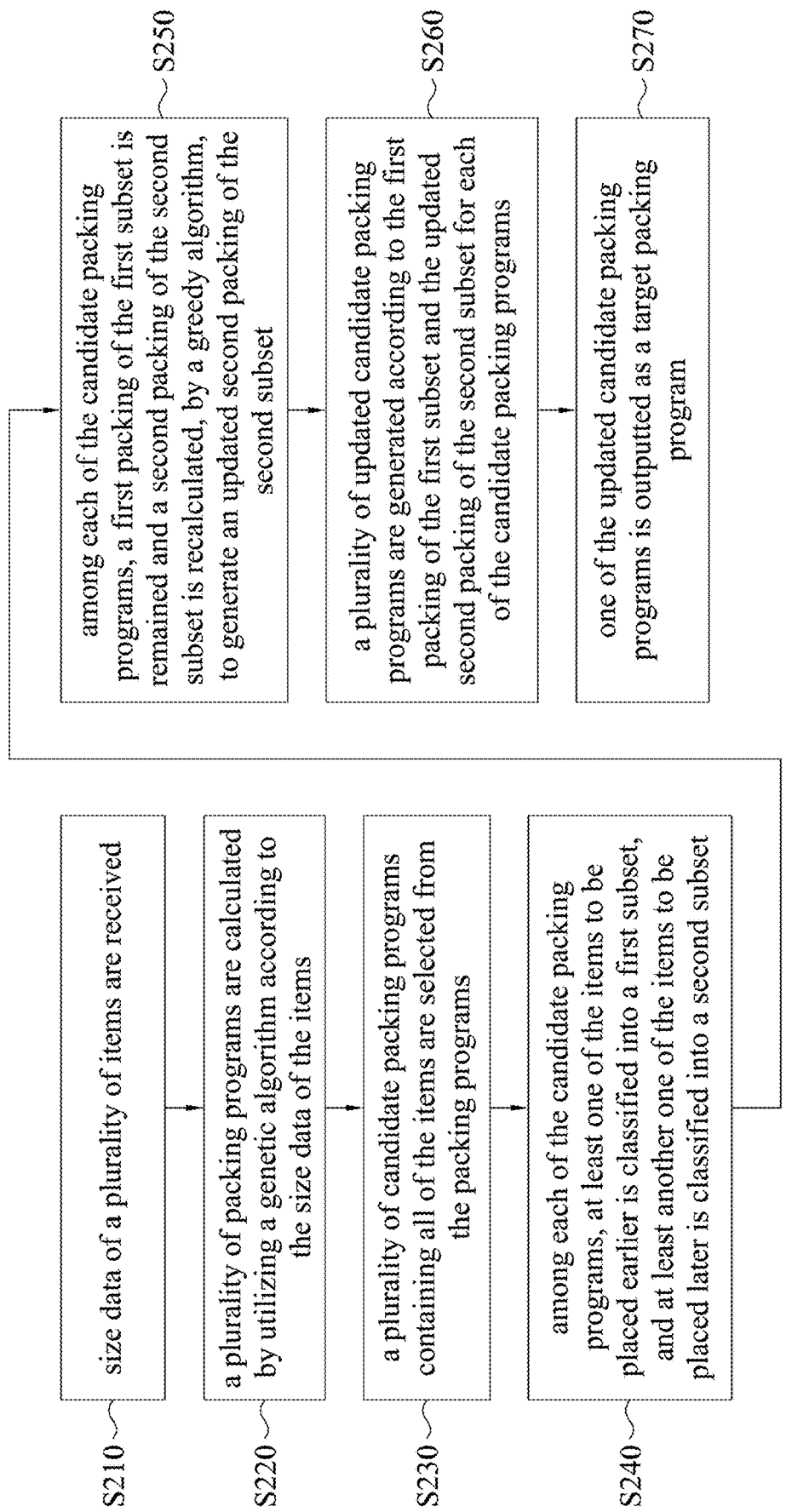
FIG. 2A is a schematic diagram of a flowing chart of a packing method in accordance with one embodiment of the present disclosure.
Figure 2B:
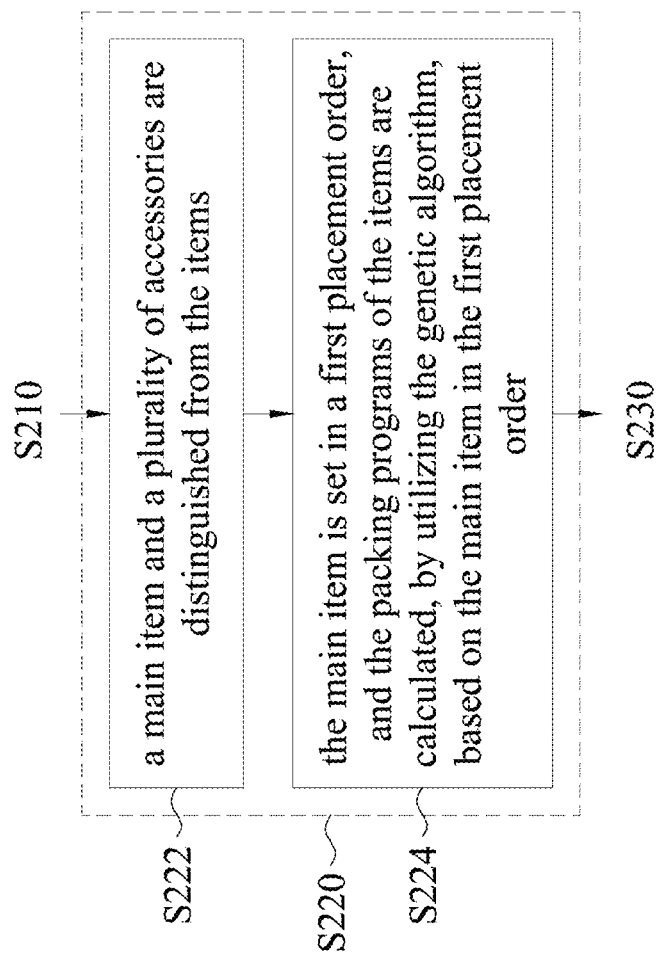
FIG. 2B is a schematic diagram of a flowing chart of step S220 in the packing method in FIG. 2A in accordance with one embodiment of the present disclosure.

Reference is made to FIG. 1. FIG. 1 is a schematic diagram of an electronic device 100 in accordance with one embodiment of the present disclosure. The electronic device 100 can be implemented by personable computer, server computer, tablet computer or other an electronic device with computing function. As shown in FIG. 1, the electronic device 100 includes a processor 110 and a memory 120. The processor 110 is electrically coupled to the memory 120, and the processor 110 is configured to access or execute instructions or data stored in the memory 120.

The processor 110 can be implemented by a central processing unit, microprocessor, graphic processing unit, field-programmable gate array (FPGA), application specific integrated circuit (ASIC) or other hardware device/element/circuit capable for accessing or executing instructions or data stored in the memory.

The memory 120 can be implemented by an electric memory device, a magnetic memory device, an optical memory device or other memory devices capable for storing or executing instructions or data. In some embodiments, the memory 120 can be implemented by a volatile memory or a non-volatile memory. In some embodiments, the memory 120 can be implemented by random access memory (RAM), dynamic random access memory (DRAM), magnetoresistive random access memory (MRAM), phase-change random access memory (PCRAM) or other memory devices.

Reference is made to FIG. 1 to FIG. 6. FIG. 2A is a schematic diagram of a flowing chart of a packing method 200 in accordance with one embodiment of the present disclosure. FIG. 2B is a schematic diagram of a flowing chart of step S220 in the packing method 200 in FIG. 2A in accordance with one embodiment of the present disclosure. FIGS. 3A~3I are schematic diagrams of a placement position, a position orientation and a position order of each of items 310 and 320 in accordance with one embodiment of the present disclosure.

Figure 4:
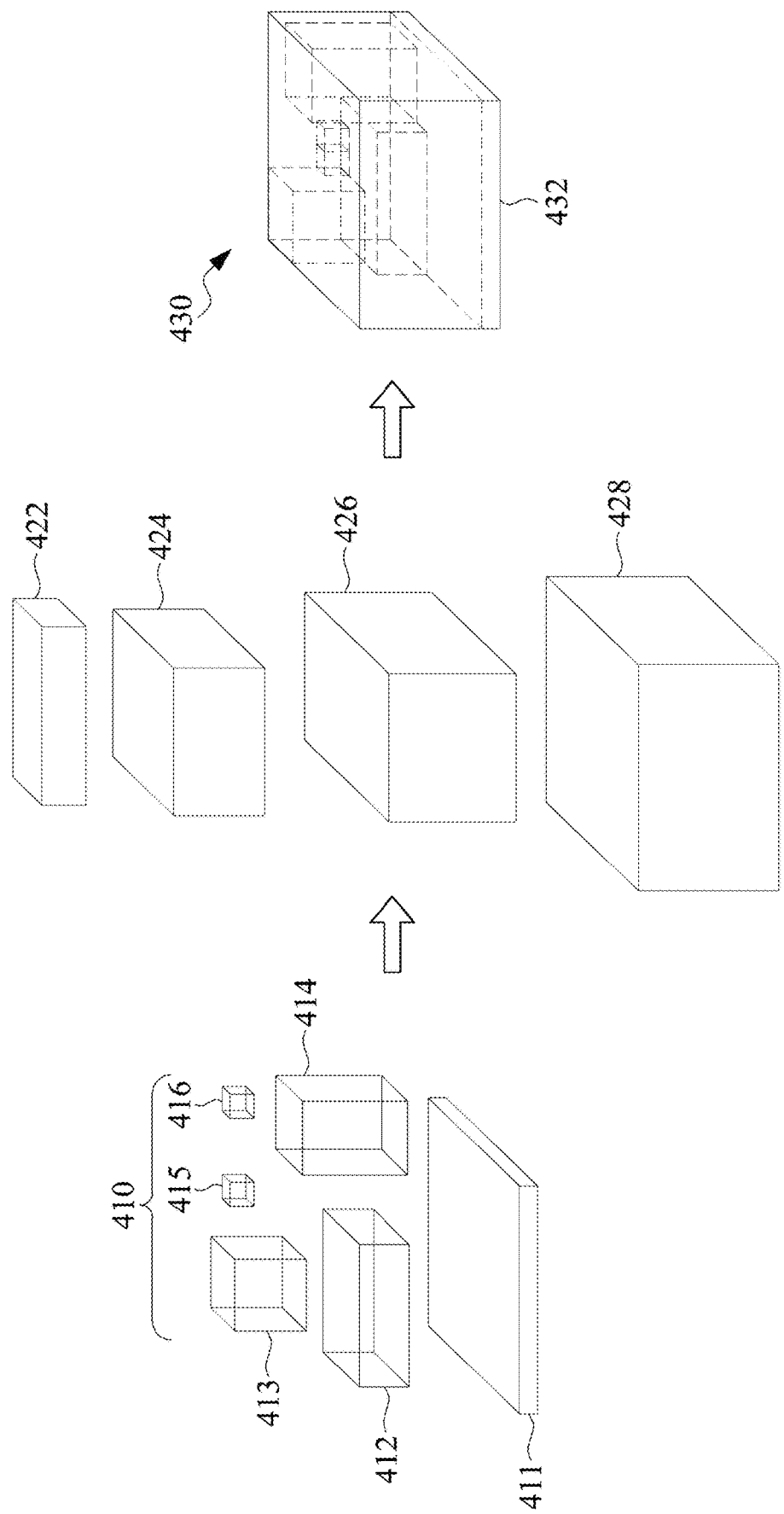
FIG. 4 is a schematic diagram of items, containers and a packing program in accordance with one embodiment of the present disclosure.
Figure 5:
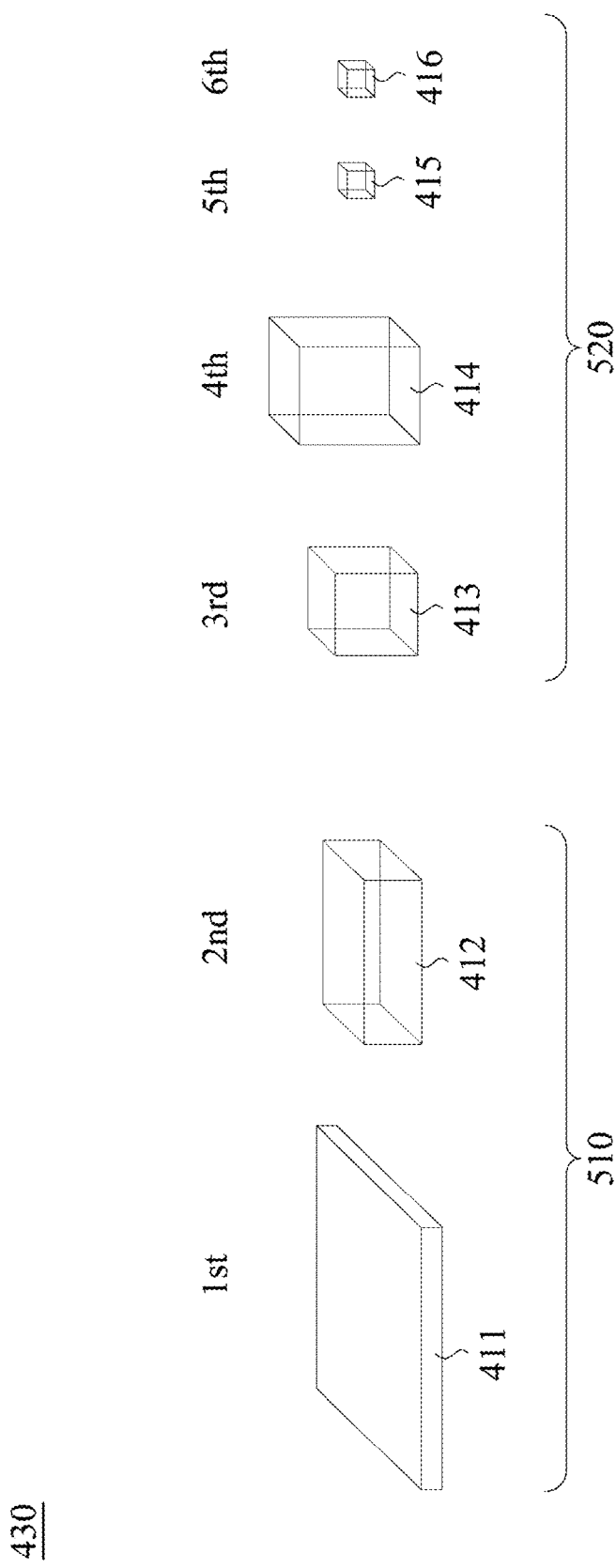
FIG. 5 is a schematic diagram of placement orders of the items included in a candidate packing program in accordance with one embodiment of the present disclosure.
Figure 6:
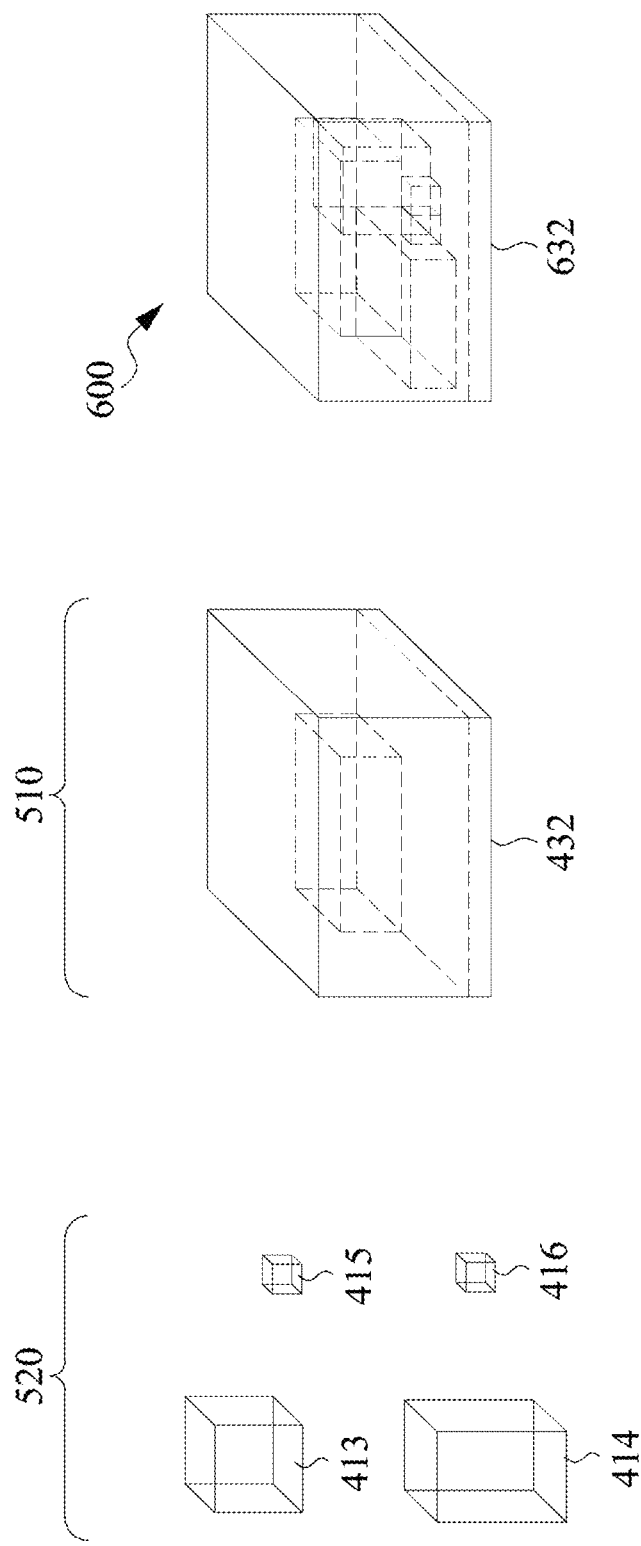
FIG. 6 is a schematic diagram of a first subset, a second subset and an updated packing program in accordance with one embodiment of the present disclosure.

FIG. 4 is a schematic diagram of items 410, containers 422~428 and a packing program 430 in accordance with one embodiment of the present disclosure. FIG. 5 is a schematic diagram of placement orders of the items 411~416 included in a candidate packing program 530 in accordance with one embodiment of the present disclosure. FIG. 6 is a schematic diagram of a first subset 510, a second subset 520 and an updated candidate packing program 600 in accordance with one embodiment of the present disclosure.

The packing method 200 includes steps S210~S270, and steps S210~S270 can be performed/executed by the processor 110. Step S220 includes steps S222 and S224. Steps S222 and S224 can be performed/executed by the processor 110.

In step S210, size data of a plurality of items are received. In some, embodiments, data of the size data of items 410 can be stored in the memory 120. In some embodiments, an order includes M items 410 (such as, six items 411~416 as shown in FIG. 4), wherein the aforesaid number of M can be implemented by any positive integer. In some embodiments, three-dimensional size data and the order are stored in a memory device (not shown) in the server 130. The processor 110 is electrically coupled or communication connection to the server 130, and the processor 110 receive the three-dimensional size data of the M items 410 from the server 130.

In some embodiments, the items 410 are items related to electronic products. In other embodiments, the items 410 are the other types of products/items to be packing. Therefore, it is not intended to limit the present disclosure.

In step S220, a plurality of packing programs are calculated by utilizing a genetic algorithm according to the size data of the items. In some embodiments, instructs and/data for the genetic algorithm is stored in the memory 120, and the processor 110 accesses the memory 120 to receive the instructions related to the genetic algorithm. The processor 110 executes the instructions relate to the genetic algorithm to calculate multiple packing programs according to three-dimensional size data of the items 411~416 and three-dimensional size data of the containers 422~428. In some embodiments, the packing programs are generated by the genetic algorithm according to variables related to a placement order and a placement orientation of each items 411~416 and sizes of the containers 422~428.

Figure 3C:
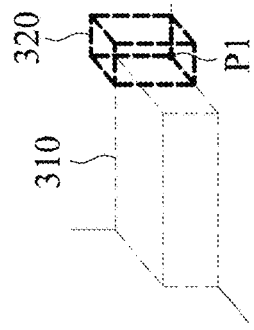
FIGS. 3A-3I are schematic diagrams of a placement position, a position orientation and a position order of each of items in accordance with one embodiment of the present disclosure.
Figure 3F:
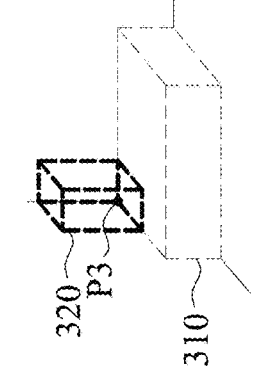
Figure 3I:
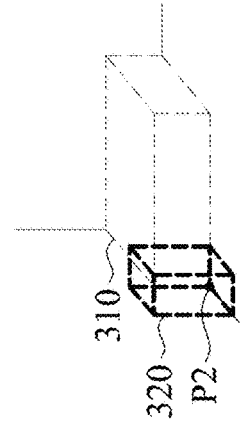
Figure 3B:
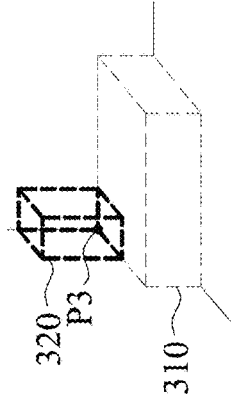
Figure 3E:
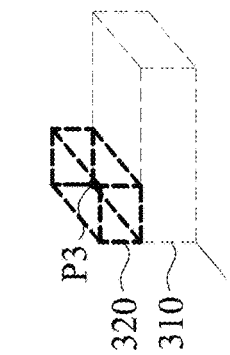
Figure 3H:
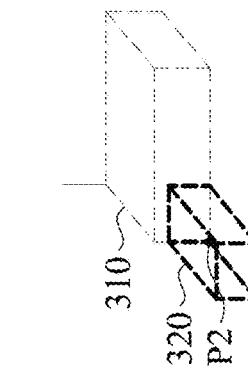
Figure 3A:
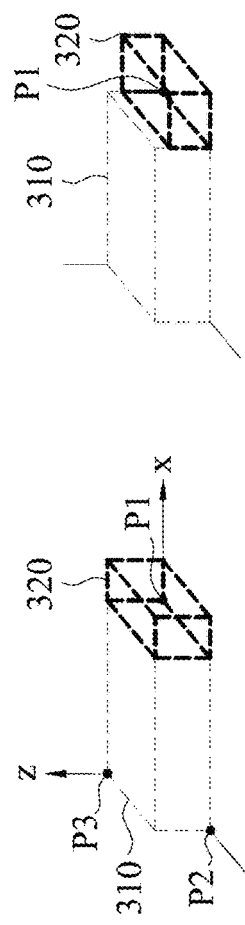

In the embodiments of FIG. 3A, the items 310 and 320 correspond to any two of the items 411~416 as shown in FIG. 4. In FIG. 3A, the items 310 and 320 are placed at one corner (which is considered as an original point in the following embodiments) of the container, the aforesaid container corresponds to one of the containers 422, 424, 426 and 428 in FIG. 4.

If the item 310 has a first placement order, and the item 310 is placed in a placement orientation at the original point of the container. Then, the original point of the container is removed from a group for positions can be placed, and positions P1, P2 and P3 are added into the group for positions can be placed.

Figure 3D:
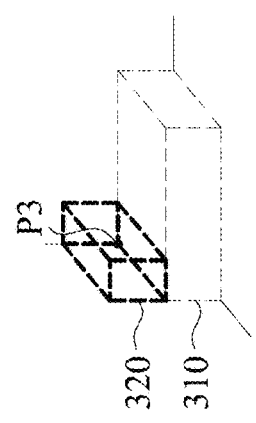
Figure 3G:
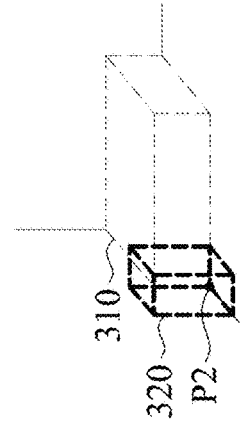

If the item 320 has a second placement order, the placement position of the item 320 can be one of the positions P1, P2 and P3, and a placement orientation of the item 320 can be a horizontal and/or vertical rotation orientation, as shown in FIG. 3A to FIG. 3I. For example, placement positions of the item 320 in the embodiments of FIGS. 3A, 3B and 3C are the same (such as, the position P1), and placement orientations of the item 320 in the embodiments of FIGS. 3A, 3B and 3C are different. On the other hands, placement positions of the item 320 in the embodiments of FIGS. 3A, 3D and 3G are the different (such as, the positions P1, P2 and P3), and placement orientations of the item 320 in the embodiments of FIGS. 3A, 3D and 3G are the same.

In some embodiments, the placement position of the item 320 can be determined by a largest attached surface area between the item 320 and the largest item has been placed (such as, the item 310). For example, in the embodiment of FIG. 3A, there is a largest attached surface area between the item 320 and the largest item has been placed (such as, the item 310) among the embodiments of FIGS. 3A-3I. As a result, the processor 110 selects the position P1 as a placement position of the item 320. In other embodiments, the placement position of the item 320 can be determined according to a largest attached surface area between the item 320 and the container. Therefore, it is not intended to limit the present disclosure.

In some embodiments, the processor 110 sorts the containers 422~428 in sequence from small to large or large to small according to two dimensional size, three-dimensional size of the containers 422~428 or other measurements (such as, surface area) of the containers 422~428. The processor 110 then selects a part of container which are larger than a volume/dimension size of all of the items 411~416 from the containers 422~428.

In some embodiments, based on the size data of each aforesaid selected containers 422~428, the processor 110 encodes the placement order and the placement orientation of each items 411~416, the processor 110 randomly generates multiple genetic codes including different information of the placement order and the placement orientation of each items 411~416, and performs selection, crossover, mutation process for the genetic codes. The selection process of the genetic codes includes a calculation for an adaptation value of each genetic codes based on an adaptation function, the adaptation function can be expressed by F1.

$$F1 = A_1 Rv + B_1 Rp + C_1 Rs$$

The abovementioned "RV" is a volume ratio of a volume of the items comprised in one of the packing programs to a volume of a container of the one of the packing programs, the abovementioned "Rp" is a completion rate of a number of the items comprised in the one of the packing programs to a number of all of the items (such as, number of items in an order). For example, if there is an order including five items to be packing in a container, one genetic code (packing program) generated by the genetic algorithm according to the order only contain three items, the completion rate is 3/5 in this case. The abovementioned "Rs" is a surface ratio of attachment surface of the items comprised in the one of the packing programs to a sum of surface area of the container. The abovementioned "$A_1$", "$B_1$" and "$C_1$" are expressed as parameters, the parameters can be implemented by appropriate values.

Therefore, the adaptation value of each genetic code can be calculated from the abovementioned adaptation function, and in the selection process, the genetic codes with the high adaption values have higher chance to be selected.

And, the crossover process is to exchange genetic information of two genetic codes to generate offspring of the next generation. The mutation process is to perform a random tweak in a genetic code to maintain diversity in the population.

As a result, the packing programs can be obtained, such as a packing program 430 shown in FIG. 4. The container 432 of the packing program 430 as shown in FIG. 4 corresponds to one of the containers 422, 424, 426 and 428.

In step S222, a main item and a plurality of accessories are distinguished from the items. Before the processor 110 utilizes the genetic algorithm to calculate the packing programs, the processor 110 can distinguish the items 411~416 into a main item and accessories. In some embodiments, the main item can be considered as one of the items 411~416 with a largest area in one surface or a largest volume, and the accessories can be considered as the other of the items 411~416.

In step S224, the main item is set in a first placement order, and the packing programs of the items are calculated, by utilizing the genetic algorithm, based on the main item in the first placement order. The processor 110 can set the main item in a first placement order, and the processor 110 utilizes the genetic algorithm to calculate the packing programs of main item and the accessories according to the main item in a first placement order, so as to reduce the calculate resources and achieve the better solution.

For the genetic algorithm, if number of the items and the containers is too large, a better solution might be generated through lots of iterations by performing genetic operations on the initial chromosome. Therefore, in some embodiment of the present disclosure, the number of iteration is set to be less than a threshold (such as, 20, 30, 50 or other number), then items in the packing programs generated by the genetic operations are classified into two subsets according to the placement order of each items, and a greedy algorithm is utilized to calculate an optimal solution of the items after classification, so as to calculate a better packing program in less time. How to utilize the greedy algorithm will be described in detailed in the following embodiments.

In step S230, a plurality of candidate packing programs containing all of the items are selected from the packing programs. A part of the packing programs generated by the genetic algorithm contains all of the items 411~416, and the other part of the packing programs generated by the genetic algorithm may not contain all of the items 411~416. To contain all the items 411~416 included in an order in the container, the processor 110 selects the part of the packing programs containing all of the items 411~416 as candidate packing programs. In other word, the candidate packing programs contains packing data of all of the items 411~416. For example, the packing program 430 which contains all of the items 411~416 is selected by the processor 110 as one of the candidate packing programs, as shown in FIG. 4.

In other embodiments of step S230, after the packing programs are generated in iterations in step S220, under a condition to contain all of the items 411~416, the part of the packing programs with high adaption values can be selected by the processor 110 as the candidate packing programs, according to the adaptation values of the packing programs.

In step S240, among each of the candidate packing programs, at least one of the items to be placed earlier is classified into a first subset, and at least another one of the items to be placed later is classified into a second subset. As shown in FIG. 5, if the items (such as, six items 411~416) in the candidate packing program (such as, packing program 430) are respectively in a first placement order to a sixth placement order. N items to be placed earlier (such as, the items 411~412 in a first to second placement order of the packing program 430) are classified into a first subset 510, (M-N) items to be placed later (such as, item 413~416 in a third to sixth placement order of the packing program 430) are classified into a second subset 520. The numbers of M and N are implemented by positive integral and the number M is greater than N.

In step S250, among each of the candidate packing programs, a first packing of the first subset is remained and a second packing of the second subset is recalculated, by a greedy algorithm, to generate an updated second packing of the second subset. In some embodiments, instructions and/or data related to the greedy algorithm can be stored in the memory 120.

In each of candidate packing programs (such as, packing program 430), a first packing of the items 411~412 included in the first subset remains unchanged. To be noted that, a packing of the first subset (such as, the items 411~412) in the candidate packing program (such as, packing program 430) is expressed in the first packing, and a packing of the second subset (such as, the items 413~416) in candidate packing program (such as, packing program 430) is expressed in a second packing. The processor 110 utilizes the greedy algorithm to recalculate a second packing the second subset (such as, the items 413~416) when the first packing of the first subset (such as, the items 411~412) remains unchanged. As a result, an updated second packing of the second subset (such as, the items 413~416) is generated by the processor 110 after the recalculation.

In some embodiments, the greedy algorithm can be implemented by an exhaustive search. An adaptation function of the greedy algorithm can be expressed by F2.

$$F2=A_2Rv+B_2Rp+C_2Rs$$

The abovementioned "RV" is a volume ratio of a volume of the items comprised in one of the candidate packing programs to a volume of a container of the one of the candidate packing programs, the abovementioned "Rp" is a completion rate of a number of the items comprised in the one of the candidate packing programs to a number of all of the items (such as, number of items in an order). The abovementioned "Rs" is a surface ratio of attachment surface of the items comprised in the one of the candidate packing programs to a sum of surface area of the container. The abovementioned "$A_2$", "$B_2$" and "$C_2$" are expressed as parameters, the parameters can be implemented by appropriate values. In some embodiments, values of the parameters of "$A_2$", "$B_2$" and "$C_2$" in the adaptation function F2 of the greedy algorithm are different from values of the parameters of "$A_1$", "$B_1$" and "$C_1$" in the adaptation function F1 of the genetic algorithm. In some embodiments, the parameter of "$B_2$" in the adaptation function F2 of the greedy algorithm can be implemented by 0.

As a result, among each of candidate packing programs, the processor 110 utilizes the greedy algorithm to calculate adaptation values for multiple packings of the second subset 520 due to the first packing of the first subset 510 unchanged. And, the processor 110 selects the one of the multiple packings of the second subset 520 with a highest adaptation value as a updated second packing of the second subset 520.

In step S260, a plurality of updated candidate packing programs are generated according to the first packing of the first subset and the updated second packing of the second subset for each of the candidate packing programs. The processor 110 generates the updated candidate packing programs (such as, the updated candidate packing program 600) according to the first packing of the first subset (such as, the first subset 510) and the updated second packing of the second subset (such as, the second subset 520) for each of the candidate packing programs.

In some embodiments, a container 632 of the updated candidate packing program 600 corresponds to the container 432. In other embodiments, the container 632 of the updated candidate packing program 600 can be reselected from the containers 422, 424, 426 and 428 with smaller volume and can contain all of the items 411~416. Therefore, it is not intend to limit the present disclosure.

In step S270, one of the updated candidate packing programs is outputted as a target packing program. In some embodiments, the processor 110 calculates adaptation values of updated candidate packing programs in step S250, and the processor 110 selects one of the updated candidate packing programs with the highest adaptation value as a target packing program.

Figure 7:
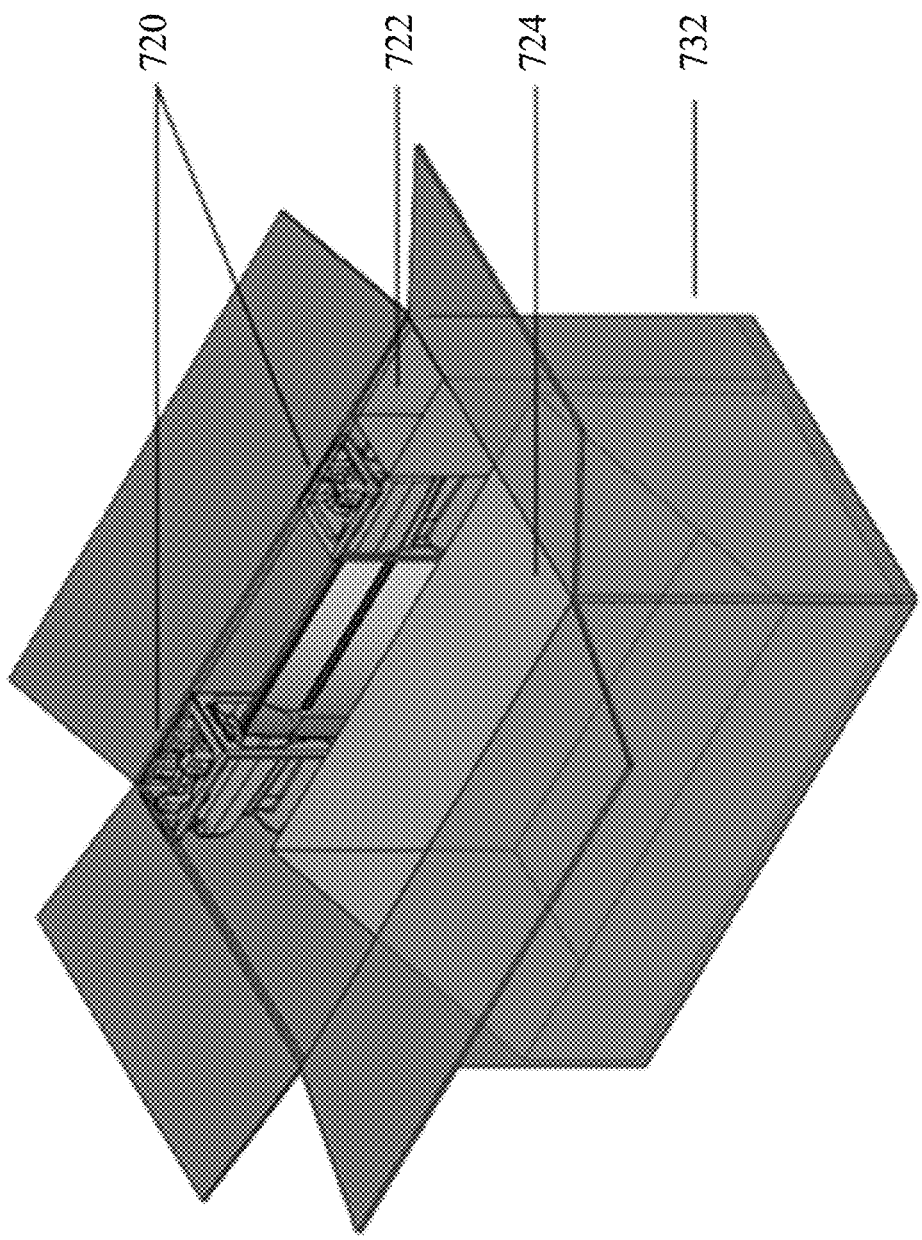
FIG. 7 is a schematic diagram of a container, paper plastics and supports in accordance with one embodiment of the present disclosure.

FIG. 7 is a schematic diagram of a container 732, paper plastics 720 and supports 722 and 724 in accordance with one embodiment of the present disclosure. In some embodiments, the container 732 corresponds to the container 632 in FIG. 6. In some embodiments, the paper plastics 720 are configured to fix and protect the important item. The supports 722 and 724 can fill the void space after placing items in the container 732, so as to avoid the items containing in the container 732 being shaking or bumping during the package delivery which may causing damages to items. In some embodiments, the supports 722 and 724 can be implemented by different materials (such as, corrugated paper, air pillows, air bag, and bubble warp) of dunnage.

Summary, the packing method 200 utilizes the genetic algorithm in conjunction with the greedy algorithm to speed up the calculation process and obtain the optimal solution. First, the processor 110 utilizes the genetic algorithm to calculate multiple packing programs for the items 411~416 and container 422, 424, 426 and 428, and the processor 110 selects a part of the packing programs which are able to contain all of the items 411~416 as the candidate packing programs. The processor 110 classifies the items 411~416 among each of the candidate packing programs into a first subset 510 and a second subset 520, and the processor 110 utilizes the greedy algorithm to recalculate the second packing of the second subset 520 when the first packing of the first subset 510 remains unchanged, so as to speed up the calculation process and obtain the optimal solution, and the volume ratio, packing efficiency and area ratio can be increased due to the optimal solution.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A packing method, comprising:
receiving size data of a plurality of items;
calculating a plurality of packing programs, by utilizing a genetic algorithm, according to the size data of the items;
selecting a plurality of candidate packing programs containing all of the items from the packing programs;
among each of the candidate packing programs, classifying at least one of the items to be placed in a container earlier into a first subset, and classifying at least another one of the items to be placed in the container later into a second subset;
among each of the candidate packing programs, maintaining a first packing of the first subset, and recalculating a second packing of the second subset, by a greedy algorithm, to generate an updated second packing of the second subset;
generating a plurality of updated candidate packing programs according to the first packing of the first subset and the updated second packing of the second subset for each of the candidate packing programs; and
outputting one of the updated candidate packing programs as a target packing program.

2. The packing method of claim 1,
wherein the packing programs of the items are calculated, by utilizing the genetic algorithm, based on a first adaptation function;
wherein among each of the candidate packing programs, the first packing of the first subset is maintained, and the second packing of the second subset is recalculated, by utilizing the greedy algorithm, based on a second adaptation function, to generate the updated second packing of the second subset; and
wherein parameters of the second adaptation function are different from parameters of the first adaptation function.

3. The packing method of claim 2, wherein the first adaptation function expressed as F1 and the second adaptation function expressed as F2 are given by:

$$F1 = A_1 Rv + B_1 Rp + C_1 Rs$$

$$F2 = A_2 Rv + B_2 Rp + C_2 Rs$$

wherein "Rv" is a volume ratio of a volume of the items comprised in one of the packing programs to a volume of a container of the one of the packing programs, wherein "Rp" is a completion rate of a number of the items comprised in the one of the packing programs to a number of all of the items, wherein "Rs" is a surface ratio of an attachment surface area of the items comprised in the one of the packing programs to a sum of surface area of the container, and wherein $A_1$, $B_1$, $C_1$, $A_2$, $B_2$, and $C_2$ are parameters with values.

4. The packing method of claim 2, further comprising:
calculating a plurality of adaptation values of the updated candidate packing programs; and
outputting the one of the updated candidate packing programs with a highest adaptation value as the target packing program.

5. The packing method of claim 1, wherein the first packing and the second packing comprise a placement position, a placement order, and a placement orientation of each of the items in the first subset and the second subset.

6. The packing method of claim 1, wherein a number of iterations of the genetic algorithm is less than a threshold.

7. The packing method of claim 1, further comprising:
utilizing the genetic algorithm to calculate the packing programs of the items and calculate adaptation values of the packing programs based on a first adaptation function.

8. The packing method of claim 7, further comprising:
under a condition to contain all of the items in the container, selecting a part of the packing programs with high adaptation values as the candidate packing programs according to the adaptation values of the packing programs.

9. The packing method of claim 1, wherein utilizing the genetic algorithm to calculate the packing programs of the items further comprises:
distinguishing a main item and a plurality of accessories from the items; and
setting the main item in a first placement order, and calculating the packing programs of the items, by the genetic algorithm, based on the main item in the first placement order.

10. An electronic device, comprising:
a memory configured to store a genetic algorithm and a greedy algorithm; and
a processor electrically coupled to the memory, the processor configured to:
receive size data of a plurality of items;
calculate a plurality of packing programs, by utilizing the genetic algorithm, according to the size data of the items;
select a plurality of candidate packing programs containing all of the items from the packing programs;
among each of the candidate packing programs, classify at least one of the items to be placed in a container earlier into a first subset, and classify at least another one of the items to be placed in the container later into a second subset;
among each of the candidate packing programs, maintain a first packing of the first subset, and recalculate a second packing of the second subset, by the greedy algorithm, to generate an updated second packing of the second subset;
generate a plurality of updated candidate packing programs according to the first packing of the first subset and the updated second packing of the second subset for each of the candidate packing programs; and
output one of the updated candidate packing programs as a target packing program.

\* \* \* \* \*